United States Patent [19]
Abrams

[11] Patent Number: 5,652,603
[45] Date of Patent: Jul. 29, 1997

[54] 3-D COMPUTER INPUT DEVICE

[76] Inventor: Daniel Lawrence Abrams, 1185 Park Ave., Apartment 4K, New York, N.Y. 10128

[21] Appl. No.: 438,997

[22] Filed: May 11, 1995

Related U.S. Application Data

[63] Continuation-in-part of Ser. No. 260,802, Jun. 16, 1994, abandoned.
[51] Int. Cl.$^6$ .................................................. G06K 11/18
[52] U.S. Cl. ............................ 345/157; 345/184; 33/516
[58] Field of Search .................................. 345/156, 157, 345/159, 161, 162, 163, 184; 33/516

[56] References Cited

U.S. PATENT DOCUMENTS

| | | |
|---|---|---|
| 3,350,956 | 11/1967 | Monge . |
| 4,520,355 | 5/1985 | Mitch . |
| 4,933,670 | 6/1990 | Wislocki . |
| 5,193,963 | 3/1993 | McAffee et al. . |
| 5,228,356 | 7/1993 | Chuang . |
| 5,230,623 | 7/1993 | Guthrie et al. .................. 33/513 X |

FOREIGN PATENT DOCUMENTS 2198216  6/1988  United Kingdom .

*Primary Examiner*—John K. Peng
*Assistant Examiner*—Nathan Joseph Flynn
*Attorney, Agent, or Firm*—Harness, Dickey & Pierce, P.L.C.

[57] ABSTRACT

An improved six degree of freedom computer mouse-like input device for intuitively manipulating a mouse pointer through three-dimension space. The device allows a human operator to more closely complement the operator's natural hand range of motion through a bounded input volume in order to interact with three-dimensional computer software programs.

9 Claims, 4 Drawing Sheets

3-D COMPUTER INPUT DEVICE

CROSS REFERENCE TO RELATED APPLICATION

This application is a continuation-in-part of prior U.S. patent application Ser. No. 08/260,802, filed Jun. 16, 1994, now abandoned.

FIELD OF THE INVENTION

This invention relates generally to computer input devices, and more particularly to an improved 3-D (three-dimensional) computer pointing device for manipulating cursor, object and associated mark positions in computer memory as well as displaying them on a computer graphical device such as a monitor or screen.

BACKGROUND OF THE INVENTION

A presently popular peripheral input device, known as a mouse, has a casing with an ergonomically contoured top which is designed to be gripped by a user's hand and which provides one or more clicker buttons for engagement with the fingers of the operator's hand. A roller ball detection device is located within the flat bottom of the mouse for detecting relative motion of the mouse when it is moved by the user with respect to a substantially flat surface. Typically, the mouse is connected by a cable to a computer device and an array of sensors within the mouse detect relative rolling contact of the ball with a desk or other surface such that a relative pointing motion is provided in two dimensions and displayed on the computer screen. In other words, motion of the mouse produces relative motion of a screen element depicted as a mouse pointer, displayed on the computer screen and whose location changes as the operator moves the mouse along the surface. In such a case, placement of a mouse on a surface does not provide a direct one-to-one mapping with a specific computer screen location. In order to select items on a computer screen, the user presses the clicker button, which produces a "mouse click", and selects the relative location on the computer screen where the mouse pointer is then located. In typical applications, the mouse pointer can be toggled between a text mode and a graphical mode such that, in the text mode, the mouse pointer is presented as a vertical rectangle (or block cursor) and in the graphical mode the mouse pointer appears as a hot spot (or arrow pointer). In the graphical mode, a computer program uses the hot spot to determine location of the pointer when the user depresses the clicker button.

Such traditional mouse peripheral devices only provide for two-dimensional relative directional detection which generally corresponds with the two-dimensional computer display screen. A recent need has arisen to develop enhanced 3-D computer peripheral control devices for use with highly active computer graphics, for example video games and advanced modeling software.

One recent attempt to produce a 3-D computer peripheral control device provides for a stationary mouse-like device mounted atop the familiar joystick. This device more specifically has a fixed base that supports a rotating and articulating post, the top of which is a mouse-shaped head provided with three clicker-buttons. The post and head are pivotally tilted relative to the base to provide for pitch, yaw, and roll, as well as translation in the X, Y and Z directions. True vertical motion is approximated by pulling up or pushing down on the head which, when in a biased mode, produces corresponding vertical motion on the computer device. Such a system is presently available under the name CyberMan™ sold by Logitech of 6505 Kaiser Drive, Fremont, Calif. Such a device, however, does not produce what is herein referred to as "intuit" user hand motions. Such which require the user to articulate their hand, while engaged with the input device, through a range of tactile motions which closely correspond to the motions of the mouse pointer in three-dimensional space as is commonly required and visualized when using newer and more complex computer software programs.

Another attempt to develop a three-dimensional mouse is disclosed in Wislocki, U.S. Pat. No. 4,933,670. This patent discloses a device which utilizes a traditional ball-type mouse arrangement wherein sensors measure ball rotation relative to first and second perpendicular axes. A collar is also provided about the ball's periphery for sensing motion along a third perpendicular axis. Like the previously mentioned system, this device does not allow for tactile or intuitive motion by an operator's hand such that it mimics the 3-D cursor motion within a computer memory. It further does not provide a realistic interactive feel. As a result, the operator must roll the ball to produce an unnatural planar motion in the X and Y directions, and must further rotate a cap collar about the ball to produce vertical, Z direction motion of a mouse pointer.

Obviously, such a system of operation does not produce fluent and instinctive operator motion of the mouse when interacting with a three-dimensional software program. Particularly, such a system is unnatural and awkward and slows down operator response, especially when playing computer games which require fast and instinctive motions.

Additional attempts have been made to create a better mouse. Like the above systems, these to have had their limitations and drawbacks.

In Lince, United Kingdom Patent Application No. 2,198,216A discloses a digital video effect unit in which a control knob is mounted on the end of two connected arms, the first being pivotally and rotatably mounted to a base and the second being pivotally connected to the end of the first. The control knob can be rotated and sensors are provided to provide four output signals indicative of the relative angular positions of the knob, both arms and the base. By further providing the control knob with a track or roller ball, two additional movements can be correlated. As seen from this construction, a full intuitive range of motion is not possible because the linkage can "seize" and therefore itself limits movement. Additionally the provision of the track ball carries with it all of the limitations with respect to intuitive movement as further described above.

U.S. Pat. No. 5,228,356 to Chuang disclose a modified joystick which includes stepper motors that vary the resistance to movement felt in the joystick.

U.S. Pat. No. 4,520,355 to Mitch also discloses a modified joystick which allows for greater movement of the joystick. It is however closely analogous to previous track balls in its manner of operation and its inability to physically provide the user with an intuitive hand motion through 3-D space.

U.S. Pat. No. 3,350,956 to Monge, merely discloses a device with six degrees of freedom for one-handed control of a vehicle moving through a fluid. Motion of the device is limited to narrow ranges and it is not intended to provide simulated 3-D movement of a point in space.

McAffe et al., U.S. Pat. No. 5,093,963, describes a universal input device intended to interface a human operator with a robot. The device has links extending from a base and connected by rotary joints in an attempt to mechanically decouple motion in all six degrees of freedom while providing a better overlap of human operator's range of motion.

Further attempts have been made to develop computerized motion control peripheral devices, namely for detecting locations in three-dimensional space to obtain highly accurate digitized positional information. Such systems are presently used in combination with accurate positional reference beds when performing engineering development or prototype work in order to accurately dimension engineered products especially when assembling a device from a series of joined together parts which might otherwise produce accumulation error during assembly.

Therefore, a need presently exists to develop a low-cost computer input device which more closely conforms to intuitive human hand motion when producing three-dimensional translation and rotation within a bounded volume in a computer memory. A computer operator might then more naturally articulate a mouse pointer when playing a game or interacting with 3-D computer software.

SUMMARY OF THE INVENTION

In order to solve the problems of the aforementioned prior art, it is an object of the present invention to provide a six degree of freedom computer peripheral control device which more-closely mimics a human operator's hand motions in a bounded input volume while facilitating interaction with modern three-dimensional computer games and software. Another object is to provide the control device in a manner which makes it affordable for home use on personal computers.

In achieving the above and other objects, the present invention provides for a device having a grippable pointer member supported and spaced and serially connected by mechanical links to a fixed position base. The joints formed between the adjacent mechanical links are provided so that each joint has one rotatable degree of freedom. The device also includes at least one extendable link which is linearly operable between extended and retracted positions. The resulting kinematic linkage is provided with position encoders which detect the rotational position of each joint as well as one which detects the actual linear displacement of the extensable link. The encoders monitor motion of each link and joint through counters and allow for calculation of relative motion of the grippable pointer member within the bounded volume. Importantly, a point whose position is being calculated within the bounded volume is not defined by the free end of the grippable position member. Rather, it is generally defined by the end of the grippable pointer member which is connected to the mechanical links discussed above. By providing this "reference point" in this manner, it is possible for the operator to hold the grippable pointer member in a fashion similar to a pen and allows the grippable pointer member to be manipulated in a more intuitive fashion than has been previously seen. This construction method also eliminates the tactile drag which would otherwise be imposed by the mechanical link if the reference point was located on the free end of the grippable pointer member. In other words, with the present invention, the reference point itself is the center of the tactile feel from the operator's standpoint and this provides the operator with a more intuitive mechanism by which to control the location of the reference point within the bounded volume. Again, it is similar to the point of the pencil whose frictional engagement with a three-dimensional surface provides the operator with the ques as to where the point is actually located.

The device also preferably includes at least one electric motor which is preferably engaged in gear mesh communication with each rotatable link, as well as with the axially extensable link, to provide controlled resistance to motion of the kinematic linkage.

Through actuation of one or more clicker buttons provided on the grippable pointer member, the motor or motors can be activated and deactivated to smoothly regulate articulation of the linkage, or fix the position of the reference point and the linkage, in space. Another clicker button on the grippable pointer member can be used to select the relative location of the reference point as an input into the computer during the operation of a computer game or program. Through careful selection of low-cost encoders, a device can be produced which is affordable to a personal computer user and which more closely mimics a human operator's range of hand motion to provide a six degree of freedom mouse input device.

Additional objects, features and advantages of this invention are to provide an improved computer peripheral control device, or mouse pointing device, which operates in six degrees of freedom within a three-dimensional bounded input volume while closely mimicking the intuitive hand motions of an operator moving a reference point in 3-D space. The invention provides for the economical construction of a computer peripheral control device which is lightweight, strong, rugged, durable, readily and easily assembled, simplified in design and much more economical to manufacture and produce.

Further objects, features and advantages of the present invention will become apparent to those skilled in the art to which the present invention relates from a consideration of the following description and the appended claims when taken in connection with the accompanying drawings.

DETAILED DESCRIPTION OF THE PREFERRED EMBODIMENT

Figure 1:
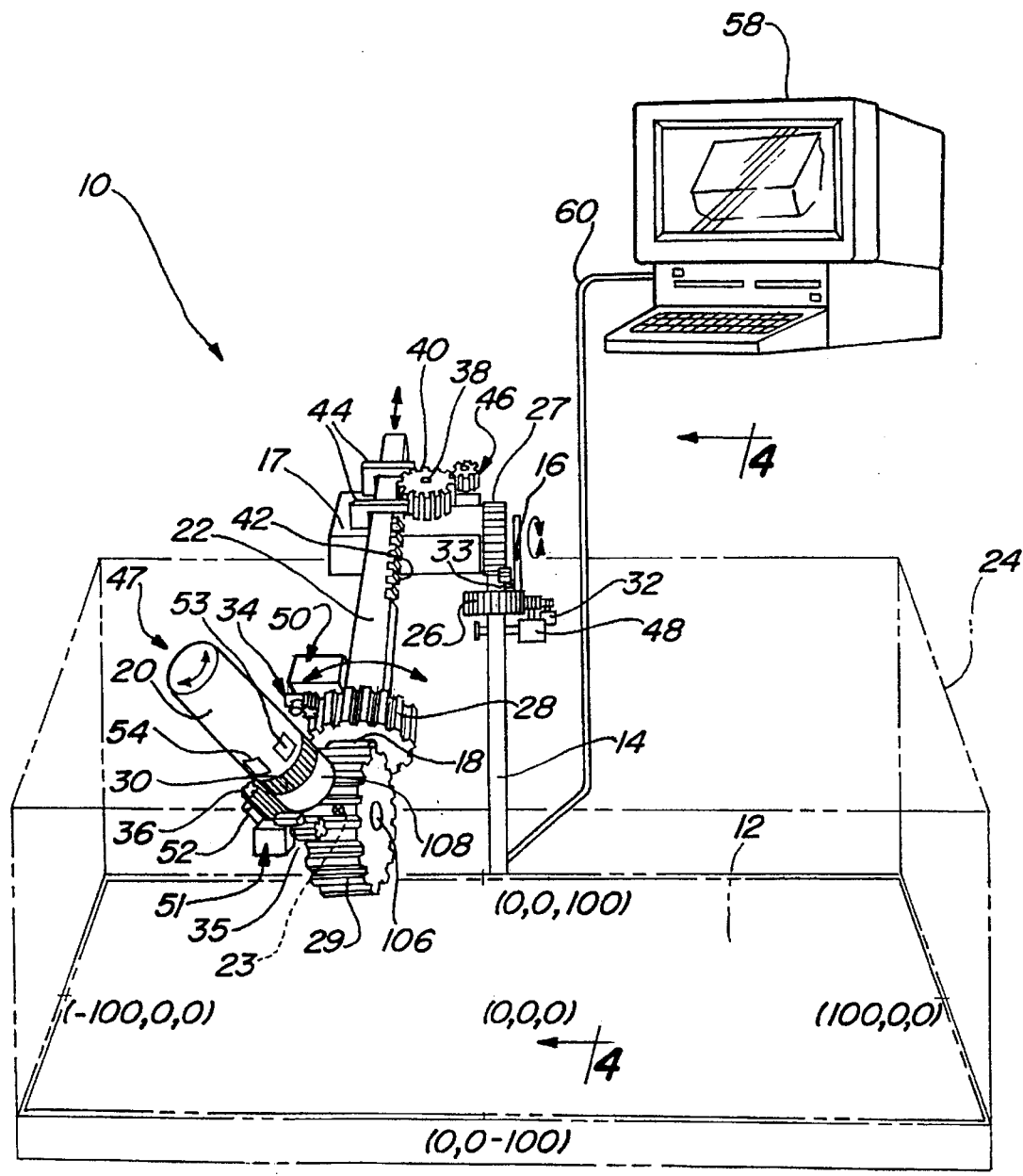
FIG. 1 is a perspective view, with all housings removed, of a computer mouse-like input device according to the present invention in which a grippable pointer member serially connected through a mechanical linkage and is supported on a fixed position base. The reference point defined by the grippable pointer member is capable of being moved by a human operator in a three-dimensional bounded input volume which is also shown in FIG. 1.

For applications where it is desirable to have a low-cost computer peripheral input device, capable of producing up to six degrees of freedom motion for correspondingly directing motion of a mouse pointer or reference point, an improved mouse-like peripheral input device is provided by the present invention. The device of the present invention substantially mimics a human operator's hand-range of motion to provide more-realistic or intuitive operator interaction with the device, particularly utilizing three-dimensional computer game software or other modeling software. Preferably, the input device is provided with at least one mouse clicker button which locks and unlocks kinematic articulation of the input device on command by the operator. Through strategic selection of the combination of rotary joints and linear extensable elements, the present device actually minimizes the operator motion needed to move a point through space. A grippable pointer member is provided with the desired six degree of freedom motion within a bounded input space or volume such that the number of connections needed to impart the most common movements is minimized and the corresponding moments of inertia in the device are likewise minimized.

In accordance with a preferred embodiment of this invention, a mouse or peripheral input device is depicted in FIGS. 1-4 and generally designated at 10. The mouse 10 has a fixed position base plate 12 and a grippable pointer member 20 which is connected to the base plate 12 through a plurality of serially connected links which allow the grippable pointer member 20 to move within a bounded input volume 24. The grippable pointer member 20 defines a reference point or mouse point which is articulable within the bounded volume 24. The grippable pointer member 20 and the mouse point 23 can be seen as simulating an pen or pencil with the mouse point being the writing end of that device and is capable of being moved about a three-dimensional surface or within a three-dimensional space. The mouse point 23 is also positioned relative to the grippable pointer member 20 such that it is within or between the linkage connecting the grippable pointer member 20 to the base plate 12. This provides the grippable pointer member 20 and the mouse 10 of the present invention with a tactile feel and more closely mimics the intuitive hand movement of an operator when physically examining a three-dimensional object or dealing with a point in three-dimensional space. It is the motion of the mouse point 23 within the bounded volume 24 which is traced and transferred to a computer as corresponding 3-D movement with respect to the computer program. The grippable pointer member 20 is supported by a plurality of serially connected mechanical links, namely a base arm 14, which is rigidly fixed to the base plate 12, and a series of connected rotary links and gears and a linear link 22. Alternatively, the mouse point 23 can be provided on the distal or outer end of the grippable pointer member 20, particularly for performing dimensional analysis tasks, such as digitizing an article into the computer's memory.

Figure 6:
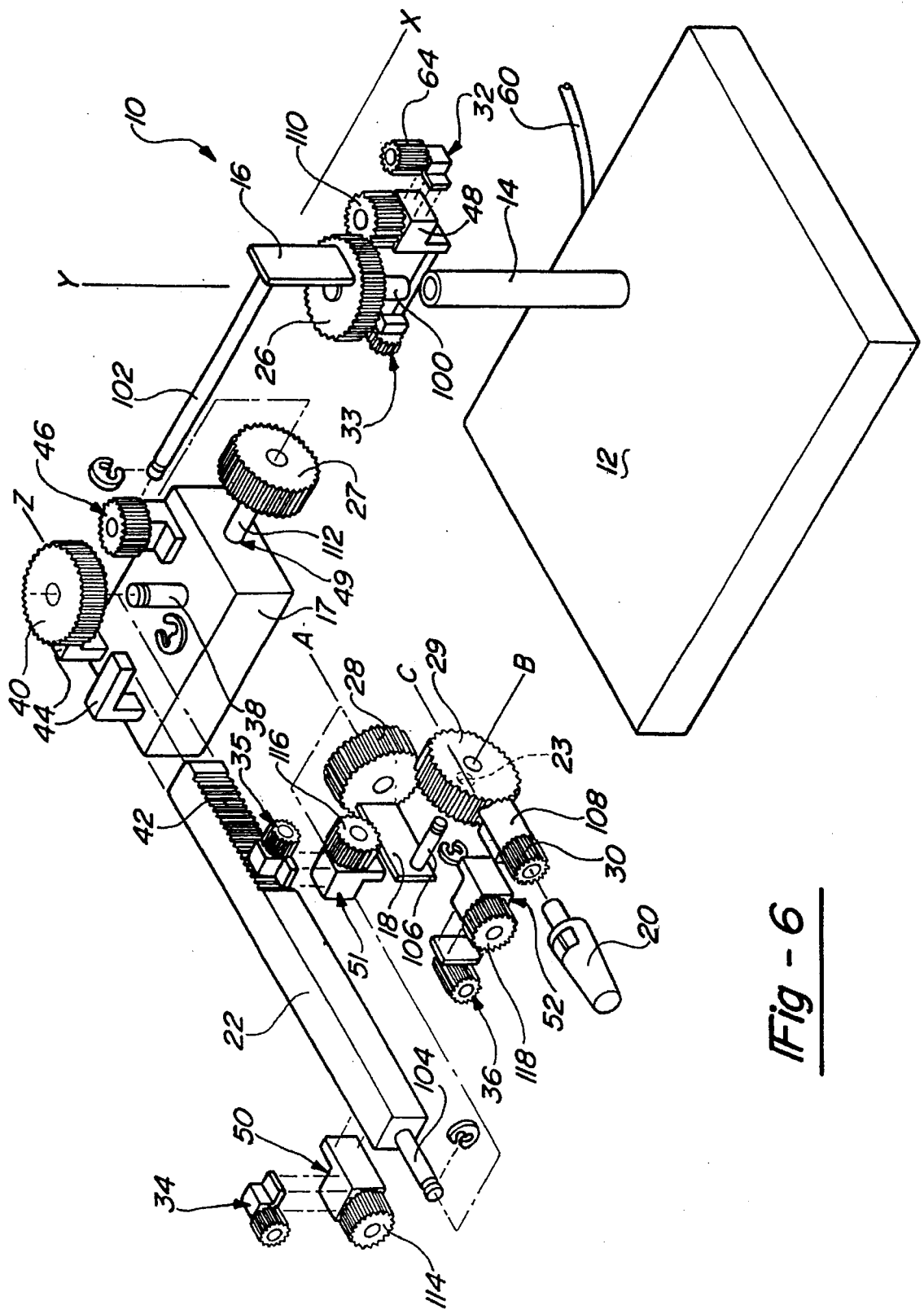
FIG. 6 is an exploded perspective view of the computer peripheral input device seen in FIG. 1.

As perhaps best seen in FIG. 6, rotary link 16 is formed as a bracket which is mounted atop the rotary gear 26. The bottom face of the rotary gear 26 receives a bushing and is mounted via a post 100 for rotation with respect to the upper end of the base arm 14 about the Y-axis.

For reasons which will be more fully explained below, the rotary joint provided by gear 26 and link 16 is raised a predetermined distance above the fixed position base 12.

In operation, the link 16 which is affixed to the top face of the gear 26 rotates with the gear 26 as the gear 26 rotates relative to the upstanding base arm 14. A horizontal portion or transverse rod 102 extends from link 16 and forms the central-axis pivot or shaft portion about which a corresponding rotary gear 27 rotates. The rotary gear 27 is rigidly formed or affixed to rotary link 17 and is therefore capable of rotating about the X-axis.

In order to monitor motion, rotary motion of links 16 and 17 relative to the base arm 14 and the rod 102, respectively, during articulation of the mouse 10, rotary encoders 32 and 33 are provided in gear-mesh communication with each gear 26 and 27, respectively. Each encoder 32 and 33 measures rotation of each rotary joint to determine relative rotation between adjacent rotary links. Such rotary encoders 32 and 33 are presently readily available from a number of commercial sources and the encoders 32 and 33 allow for the measurement of respective angles of rotation along each geared rotary joint. This information is then used by the computer 58 in calculating the kinematic articulation and positioning of the mouse point 23 in the bounded input volume 24.

A single linear link 22 is provided in the device 10 and is operable for movement between an extended position and a retracted position thereby facilitating a more efficient motion of the mouse point 23, generally depth-wise along the Z-axis, through the input volume 24 by an operator's hand motion. The linearly positionable link 22 is driven axially by a rotary drive motor 38 output shaft and gear 40 affixed to link 17, and which meshes with a linear gear rack 42 on link 22. A pair of guide brackets 44 form an axial guideway on link 17 and axially guide link 22 so that its rack 42 will engage and mesh with the rotary drive motor 38 and the gear 40. As a result, the rotary gear 40 is maintained in contact with the linear gear 42 as the drive motor 38 is actuated in forward and reverse directions to assist in extending and retracting the linear link 22 with respect to the rotary link 17.

A rotary encoder 46, similar to the previously mentioned encoders, is engaged with the rotary gear 40 and is calibrated to detect positional displacement of the linear link 22 with respect to the link 17.

Rotary link 18 is formed as a bracket mounted to the face of the rotary gear 28 which rotates about the Z-axis and a supported axle 104 extending from the end of the link 22. Accordingly, when gear 28 is rotated about the axle 104, the bracket 18 is similarly caused to rotate. In a manner similar to rod 102, an axle rod 106 extends perpendicularly from the link 18 and operates as an axle for another rotary gear, rotary gear 29.

Integrally formed with the rotary gear 29 is an arm 108 which extends from the circumferential surface of the gear 29 and supports the grippable position member 20. A transversely rotatable gear 30 is rotationally mounted to the arm 108 through a conventional method and the grippable position member 20 is secured to this gear 30 for rotation therewith.

In order to monitor the relative rotary motion between link 18 and link 22, arm 108 and link 18, and grippable position member 20 and arm 108, rotary encoders 34, 35 and 36 are provided in gear-mesh communication with each of the gears 28, 29 and 30, respectively. As with the prior encoders 32 and 33, the present encoders 34-36 measure relative rotation of each rotary joint to determine the relative rotational position between adjacent rotary links. Also as with the prior encoders, these encoders are of a commercially readily available design and therefore may not be further described herein.

Preferably, the grippable position member 20 axially extends from rotary gear 29 and the mouse point 23 is generally defined by a point located within the arm 108 or gear 29, at or adjacent to the intersection of the rotational axes of gears 30 and 29.

Although not physically accessible as such, this locating of the mouse point 23 allows for a construction of the rotary link 18 and member 20 in a simplified manner. This construction is quite suitable for use with three-dimensional computer games where positioning of the mouse point 23 within space is directed by relative motion of the operator's hand and the kinematic linkage. Providing the mouse point 23 in this manner, generally interiorly of the grippable position member 20 and otherwise within the linkage, provides the user with a intuitive range of motion in locating the mouse point 23 as desired in the bounded volume 24. Gripping the peripheral position member 20 is therefore quite similar to the gripping of a pen or pointer device and its "point" 23 can be similarly manipulated to that of an actual pen. The linkage itself also provides for a tactile feel where inherent frictional forces of the mouse 10 are felt by the operator at the mouse point 23 through the grippable position member 20. This is a more natural intuitive feeling to the operator.

Alternatively, the arm 108 can be secured to the gear 29 in an offset manner so that the mouse point end which still maintains rotary axle 106 and can be supported on rotary link 18 in an offset manner such that mouse pointer 23 can be defined by a protruding point which still maintains spatial location generally coincident with the rotational axes of rotary gears 28–30. Such an alternative construction allows for the exposed placement of the mouse point 23 on physical objects when, for example, performing dimension-analysis or when tracing contoured surfaces with the mouse 10. However, for most user-interfacing with three-dimensional computer software games, access to mouse point 23 is not necessary and the previously detailed construction is preferred in order to simplify construction, reduce operator hand motions, and reduce cost.

In one preferred embodiment, the computer input device 10 of this invention is also provided with a "smart resistance" motor system which is formed by mounting motors such as stepper motors, 48–52, in combination with axial drive motor 38 mentioned earlier. By controlling rotation of each motor 48–52, the rotation and movement of each link can be restrained or assisted. The first of these motors, motor 48, is mounted so that its drive gear 110 is in gear-mesh communication with gear 26. The motor 48 therefore assists or resists rotation of the mouse 10 about the Y-axis through the upstanding arm 14 of the base 12. Similarly the next motor 49 has its drive gear 112 coupled to gear 27 and assists or resists rotary movement about the X-axis and rod 102. The position encoder 33 could be directly coupled to this motor 49 so that the gear of the position encoder 33 or the gear 112 of the motor 49 is used to directly assist or resist movement of the gear 27 and the rotary link 17. A third one of these motors, motor 50 is coupled via its drive gear 114 to assist/resist movement of gear 28. Motor 51 and motor 52 are mated with gear 30 by its drive gear 118. The motors 48–52, drive gears 110–118 and encoders 32–36 and 46 are probably best seen in the exploded view of FIG. 6. The drive motor 38 can also be provided to produce assistance/resistance in the linear movement of link 22.

By interconnecting each electric motor 38 and 48–52 to a microchip (not shown) located within the mouse 10 or the computer 58 itself, motion of the mouse 10 can be regulated to achieve several goals. First, by tailoring a software subroutine which monitors movement, the microchip can receive instantaneous, real time information about accelerational and directional movements of the mouse pointer 23. The subroutine can then tell respective motors to continue in the corresponding directions at a steady, accelerating or decelerating speed and provide dynamic assistance to kinematic articulation of the mouse pointer 23. Accordingly, the motors 38 and 48–52, the microchip and subroutes can be tailored to provide the mouse 10 with a speed sensitive, power steering system, appropriately responding to the actual 3-D movements inputted by the operator. The microchip and computer program subroutine are not further described herein since such items are already commercially available or well with the capabilities of a software programmer.

Such a smart resistance motor system can be enabled and disabled by providing a clicker button 53 on the grippable position member 20. When disabled or locked, the system prevents movement of the mouse 10 and retains the mouse pointer 23 in a fixed position until further use was desired. By clicking the clicker button 53 again, the mouse 10 becomes enabled for further use. This is advantageous in that it lets the operator pick up in 3-D space precisely where movement of the mouse pointer 23 was last left off. No longer must the operator reposition the mouse pointer 23 where movement was stopped before continuing.

Likewise, a second clicker button 54 can be provided for triggering positional detection of the mouse pointer 23 in the bounded input volume 24 by the computer 58 as according to the software program being used. In this manner, each clicker button 53 and 54 operates similarly to a standard mouse clicker-button.

Preferably, positional information regarding the mouse pointer 23 is transmitted to the computer 58 through a data bus 60 wherein encoders 32–36 and 46 provide relative rotational and axially positional information to the computer 58 where the appropriate kinematic calculations are performed to precisely determine the position of the mouse pointer 23 within the bounded input volume 24. These calculations are themselves only necessary to determine the relative motion and position of the mouse pointer within the bounded input volume 24. As previously mentioned, the mouse 10 can be constructed for accurately measuring a 3-D object within the input volume 24 for additional dimensional analysis of the object or modeling.

Figure 5:
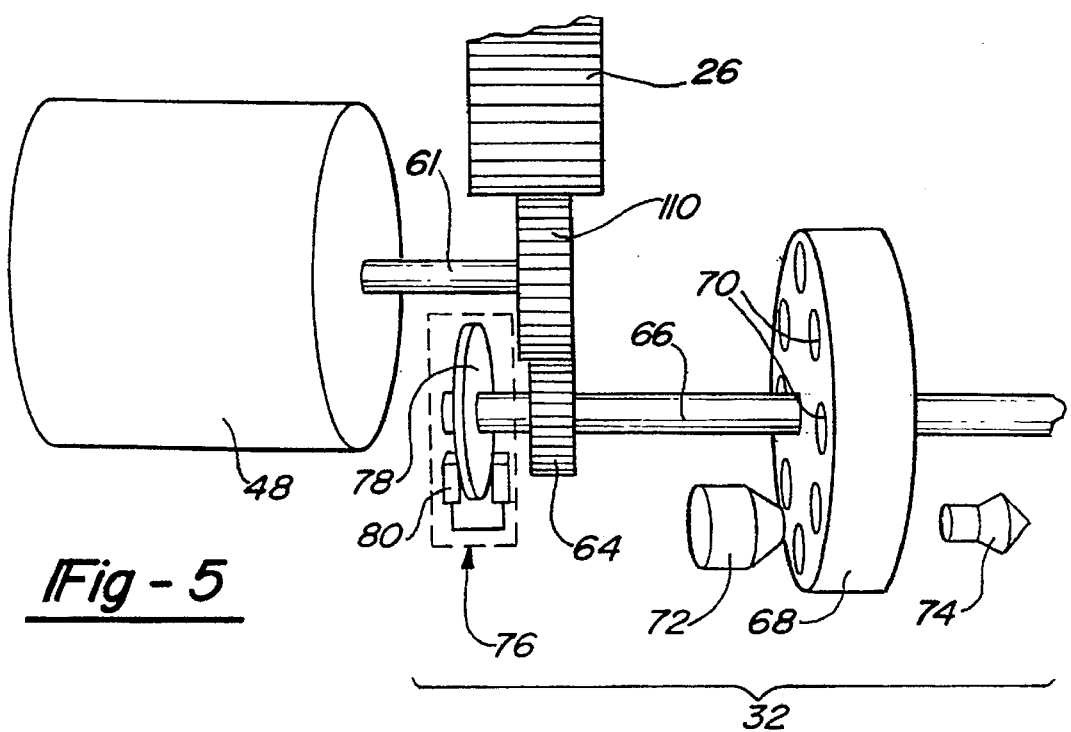
FIG. 5 is an enlarged partial perspective view of a typical linkage rotary joint showing an electric motor as embodied by the present invention and coupled with a rotary encoder in a linkage rotary joint.

In FIG. 5, one embodiment of an arrangement is depicted for providing the smart resistance system for assisting/resisting movement of mouse pointer 23. This embodiment is schematically shown with respect to the rotary joint which permits rotation about the Y-axis but obviously is applicable to all of the rotary joints in the mouse 10. Rotary gear 26 is provided in direct gear-mesh communication with the motor 48 through an input/output shaft 61 and the driven gear 110. Also in gear-mesh communication with motor gear 62 is the input gear 64 of the encoder 32. The input gear 64 is carried on an encoder shaft 66 and, at one end the shaft 66, is a rotary wheel 68 having a plurality of circumferentially equispaced openings or eyes 70. A photo diode 72 is provided to substantially align with an LED 74 located on the opposite side of the wheel 68. As each eye rotates between the photo diode 72 and LED 74, a "tick" or count is registered by the photo diode 74 by measuring the light output from the LED 74. By counting the ticks and their rate, rotation of the gear 26 can be determined by the computer 58 or microchip. For example, the output from the diode 72 is through-passed to the computer 58 via data bus 60 where it is monitored in a subroutine. Also provided on the shaft 66 is a brake 76 capable of resisting or locking motion of the motor 48 and the gear 26. Preferably, such a brake 76 is incorporated in the smart-resistance system of each joint in this invention to slightly resist movement, slow down movement, or lock out the system. Operation of the multiple encoders, brakes and motors can also be coordinated by the computer 58 so that movement of the mouse pointer 23 is restricted along an axis or, with more complex software, outside of a 3-D shape modeled on the computer.

Alternatively, the inherent resistance in the motors can provide sufficient resistance to maintain each joint in its position when an operator is no longer providing an input through the grippable position member 20. In another embodiment without the motors, the inherent frictional resistance in the joints themselves would maintain the location of the mouse pointer 23 when not in use. Such resistance locks the mouse 10 and prevents its joints from going "limp" and causing the assembly to droop under its own weight. By providing the brakes 76 or other mechanisms, assurances can be made to rigidly locate the mouse 10 in space. In yet another embodiment, a third clicker button (not shown) can be provided for separately activating all of the brakes 76 along locking each motor. The brake 76 itself would be comprised of a brake disk 78 mounted on the shaft 66 and a brake calliper or shoe 80 which is activated and deactivated to grip the brake disk and stop rotation of the shaft 66, motor 48 and gear 26.

Figure 2:
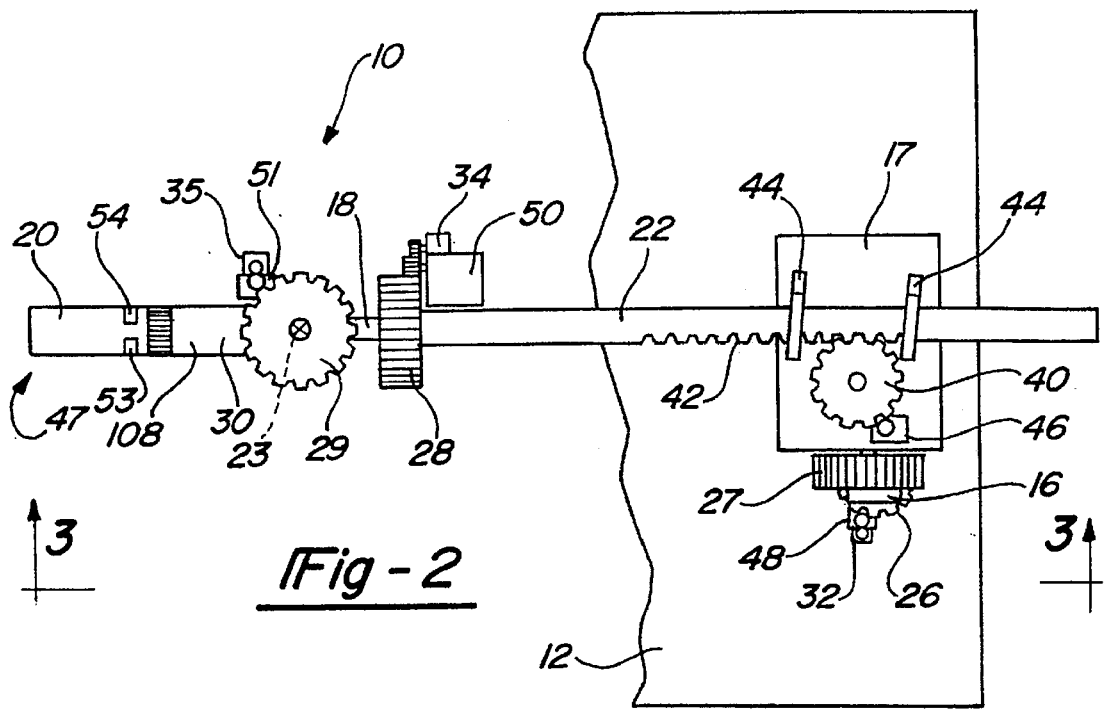
FIG. 2 is a top plan view of the computer peripheral input device of FIG. 1 without its showing the linearly extensable link.
Figure 3:
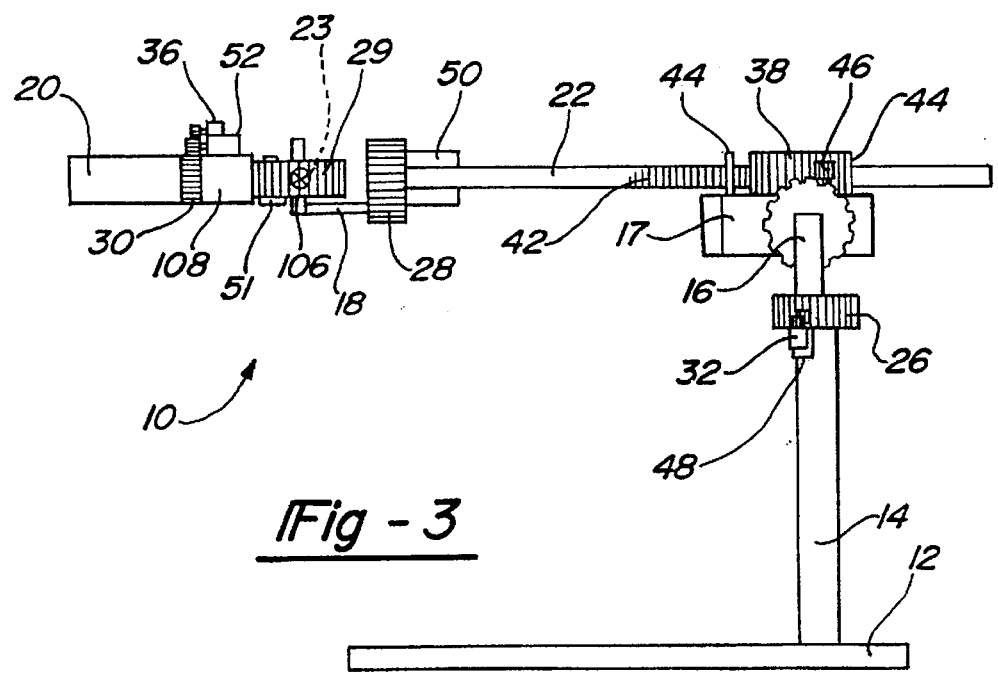
FIG. 3 is a side elevational view of the computer peripheral input device taken substantially along line 3—3 in FIG. 2.
Figure 4:
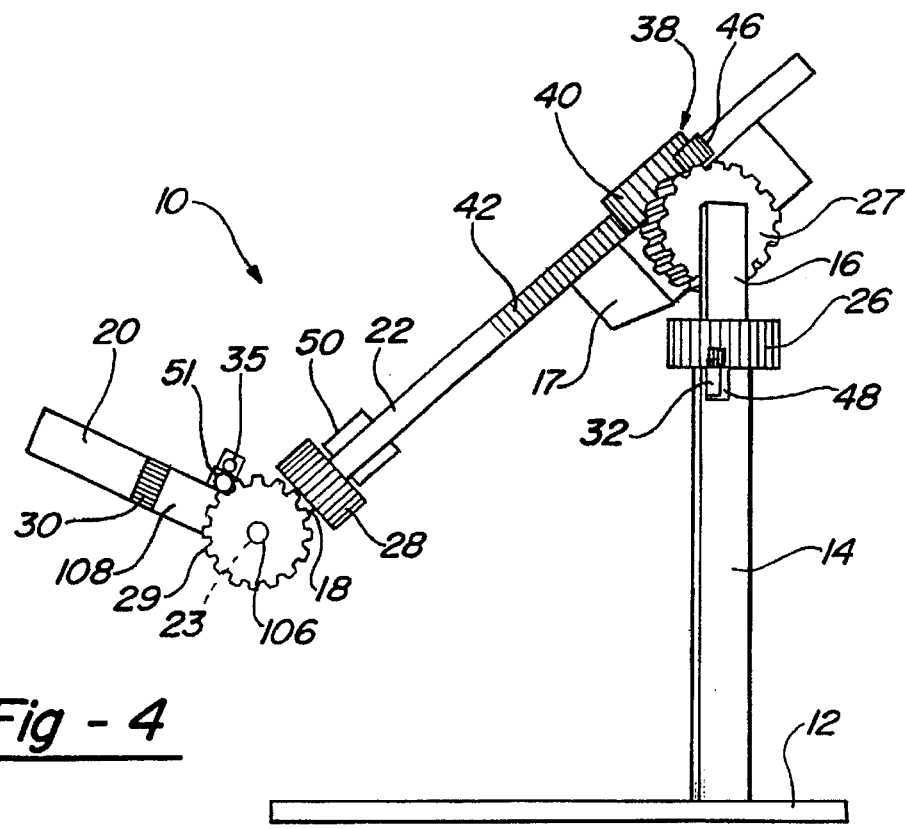
FIG. 4 is another side elevational view of the computer peripheral input device taken substantially along line 4—4 of FIG. 1 and showing the device with the extensable linkage rotated into a sloped down position as previously depicted in FIG. 1.

FIGS. 1 and 4 depict the mouse 10 of this invention with link 17 rotated generally downwardly to orient the link 22 downward and the grippable position member 20 upwardly. This presents the grippable position member 20 in a natural writing position which facilitates use by an operator's hand. In contrast, FIGS. 2 and 3 depict the same device but with link 17 rotated to horizontally orient link 22 and arm 108 likewise rotated to substantially horizontally orient the grippable position member 20.

As shown in each of the figures, concentration of links 16 and 17 on the upper end of the base arm 14 facilitates a sweeping rotation both upward and downward, as well as sideways of the linear link 22 within the bounded input volume 24. Furthermore, extension and retraction of the linear link 22 allows for substantially full displacement of the grippable position member 20 within the full input volume 24, both readily and easily by a human operator's hand. As a consequence, the movement of the mouse pointer 23 within the bounded volume more intuitively corresponds or mimics normal human hand motion and actual working with a 3-D object. Importantly, it is the axial movement of the link 22 and the raised rotational pivot at gear 26 which probably most appropriately provide for this movement. As this construction is described, the operator can be seen as being able to work in 3-D space while maintaining his/her elbows on the support surface or base 12. Greater control over the position of the mouse pointer 23 can thus be achieved. Obviously, links 18, 106 and 108 and grippable position member 20 function to manipulate the orientation of the positioned mouse pointer 23 and the X, Y, and Z axes. By providing a mouse 10 which imparts X, Y, and Z translational motions to the tip-end 23 via the links 16, 17 and 22, the masses of such corresponding links are located substantially radially adjacent to the base arm 14 and this in turn reduces the effect of inertia about grippable position member 20 and the mouse pointer 23. The further rotational facilitation of the mouse pointer 23 via links 18, 106 and 108 and member 20, allows for orientational or rotational positioning of the mouse pointer 23 at the located point in a manner which more easily mimics a human operator's range of hand motion. It also simplifies touch-and-feel for an operator desiring to rotate the positioned point in the three-dimensional bounded input volume 24 by allowing for intuitive movement of the mouse pointer 23.

In summary, the mouse 10 of the present invention emulates the motion produced by an operator's hand during articulation of the operator's arm via bending motions at his/her elbow. Furthermore, rotations of links 16 and 17 in combination with axial motions of the linear link 22 combine to create displacement of the mouse pointer 23 with respect to the three primary axes of displacement, namely the X, Y, and Z axes of a Cartesian coordinate system. The rotary and axial motions produced by link 16, 17 and 22 emulate those motions of a human shoulder joint, elbow and arm as they produce displacement motions of the grippable position member 20 and the mouse pointer 23. The rotary links 18, 106 and 108 as well as member 20, combine to create 3-D orientational positioning of the mouse pointer 23 at a particular X, Y and Z position in space, analogous to movement of the human wrist and fingers.

By eliminating rotary movement of links 18, 106, 108 and 20, a three-dimensional positional input device results. This device will allow for measured motion of the mouse pointer 23 within the bounded input volume 24. Such a modification may be desirable in order to reduce costs where the orientational positioning of the mouse pointer 23 is not needed.

While the above description constitutes the preferred embodiments of the present invention, it will be appreciated that the invention is susceptible to modification, variation and change without departing from the proper scope and fair meaning of the accompanying claims.

I claim:

1. A peripheral, mouse-like 3-D input device for a computer, said device for inputting three-dimensional positional information to a computer corresponding to a reference position within a bounded input volume, said device comprising:

a substantially planar base;

a arm extending upward from said base, said arm being rigidly connected to said base and relatively immovable with respect thereto;

a first rotary member rotatably mounted to an upper end of said arm for rotary movement with respect thereto about a first axis longitudinally through said arm;

a first position encoder means coupled to said first rotary member, said encoder means for providing an output corresponding to the rotational position of said first rotary member about said first axis and relative to said arm;

a first link member rigidly secured to said first rotary member for rotation therewith, said first link member including a transverse portion extending normally with respect to a plane through said first axis;

a second rotary member rotatably mounted to said transverse portion of said first link member for rotary movement about a second axis perpendicular to said first axis;

a second encoder means coupled to said second rotary member, said second encoder means for providing an output corresponding to a rotational position of said second rotary member about said second axis and relative to said transverse portion of said first link member;

a second link member rigidly secured to said second rotary member for rotation therewith about said second axis;

a third link member movably mounted to said second link member for rotational movement therewith, said third link member also being mounted to said second link member for translational axial movement of said third link member along a third axis mutually perpendicular, to said first and second axes;

third encoder means coupled to said third link member, said third encoder means for providing an output corresponding to an axial position of said third link member along said third axis and relative to an axial position of said third link member and to said second link member;

a third rotary member mounted to said third link member for rotation about said third axis;

a fourth encoder means coupled to said third rotary member, said fourth encoder means for providing an output corresponding to a rotational position of said third rotary member about said third axis and relative to said third link member;

a fourth link member rigidly secured to said third rotary member for rotation therewith about said third axis, said fourth link member including a transverse portion extending perpendicularly from a plane through said third axis, said transverse portion of said fourth link member defining a fourth axis;

a fourth rotary member mounted to said transverse portion of said fourth link member for rotation about said fourth axis;

a fifth encoder means coupled to said fourth rotary member, said fifth encoder means for providing an output corresponding to a rotational position of said fourth rotary member about said fourth axis and relative to said fourth link member;

a fifth link member rigidly secured to said fourth rotary member for rotational movement therewith about said fourth axis, said fifth link member including a transverse portion extending perpendicularly from a plane through said forth axis;

a fifth rotary member rotatably mounted to said transverse portion of said fifth link member for rotation about a fifth axis extending through said transverse portion of said fifth link member;

a sixth encoder means coupled to said fifth rotary member, said sixth encoder means for providing an output corresponding to a rotational position of said fifth rotary member about said fifth axis and relative to said fifth link member;

a grippable input member rigidly coupled to said fifth rotary member, said input member adapted to be gripped by an operator of said device to induce rotational movement of said fifth rotary member about said fifth axis;

a reference point generally defined adjacent to an intersection of said fourth and fifth axes and indicating a position in three-dimensional space within said bounded input volume, said reference point being moveable within said bounded input volume through manipulation of said input member by an operator, whereby said first, second, third, fourth, fifth and sixth encoder means provide output signals to said computer enabling said computer to correlate said output signals and provide a graphical representation of a three-dimensional position of said reference point on a computer display, said device thereby providing for the intuitive movement of said reference point by an operator within said bounded input volume; and a switch means located on said input member, said switch means being actuatable for providing a signal to said computer and causing said computer to store said three-dimensional position of said reference point in said bounded input volume at an instance when said switch means is actuated.

2. The 3-D input device as set forth in claim 1 wherein said input member is a pen-type assembly having a mouse button operable to trigger detection of said reference position.

3. The 3-D input device as set forth in claim 1 wherein said reference position is defined in a location other than a distal end of said input member.

4. The 3-D input device as set forth in claim 1 wherein said device further comprises retention means for retaining said reference point in a given three-dimensional location within said bounded input volume after releasing of said input member by the operator.

5. The 3-D input device as set forth in claim 4 wherein said retention means includes brake means for preventing relative movement between said link members and said rotary members of said device.

6. The 3-D input device as set forth in claim 5 wherein said brake means applies a positive force to prevent relative movement.

7. The 3-D input device as set forth in claim 4 wherein said retention means includes a motor system incorporated into said device.

8. The 3-D input device as set forth in claim 7 wherein a second switch means on said input member is operable for enabling and disabling said motor system and permitting locking of said reference point in a specific location when said motor system is disabled.

9. The 3-D input device as set forth in claim 7 wherein said motor system includes individual motors associated with said first, second, third, fourth, fifth and sixth encoder means for assisting and or resisting movement, said individual motors being in control communication with a microchip which activates and deactivates said motors in response to said second switch means.

* * * * *